United States Patent [19]

Soref et al.

[11] Patent Number: 4,746,183
[45] Date of Patent: May 24, 1988

[54] ELECTRICALLY CONTROLLED INTEGRATED OPTICAL SWITCH

[75] Inventors: Richard A. Soref, Newton Centre; Joseph P. Lorenzo, Stow, both of Mass.

[73] Assignee: The United States of America as represented by the Secretary of the Air Force, Washington, D.C.

[21] Appl. No.: 50,358

[22] Filed: May 18, 1987

Related U.S. Application Data

[63] Continuation-in-part of Ser. No. 831,895, Feb. 24, 1986.

[51] Int. Cl.$^4$ ................................................. G02B 6/10
[52] U.S. Cl. ............................. 350/96.14; 350/96.13
[58] Field of Search ............... 350/96.13, 96.14, 96.15, 350/96.12; 357/19

[56] References Cited

U.S. PATENT DOCUMENTS 4,420,873 12/1983 Leonberger et al. ............ 350/96.12

Primary Examiner—Gene Wan
Assistant Examiner—James C. Lee
Attorney, Agent, or Firm—Donald J. Singer; Jules J. Morris

[57] ABSTRACT

An electrically controlled integrated optical switch having a body made up entirely of crystalline silicon. More specifically, the body has a pair of channel waveguides intersecting in an X-like configuration forming therein an intersection crossover region. A first electrode is positioned on the intersection crossover region and a second electrode is positioned on the bottom of the body opposite the intersection crossover region. A controllable current/voltage source is electrically connected to the electrodes in order to alter the index of refraction of the intersection crossover region by carrier injection in order to selectively switch optical signals between diverging waveguides.

10 Claims, 5 Drawing Sheets

ELECTRICALLY CONTROLLED INTEGRATED OPTICAL SWITCH

STATEMENT OF GOVERNMENT INTEREST

The invention described herein may be manufactured and used by or for the Government for governmental purposes without the payment of any royalty thereon.

RELATED APPLICATION

This application is a continuation-in-part of application Ser. No. 831,895, filed Feb. 24, 1986.

BACKGROUND OF THE INVENTION

This invention relates generally to integrated optical circuits and the components making up such circuits, and, more particularly, to integrated optical switches made completely of silicon which are controlled by the passing of an electric current therethrough.

With recent increased development of lasers and optical fibers, more attention has been directed to integrated optical systems or circuits and the components which make up these circuits. Particular concern has been directed to the area of optical communications which operate at a wavelength 1.3 μm and beyond and the integrated optical circuits which are utilized therein. Since it has been recognized that integrated optical components are capable of coupling efficiently to single-mode optical fibers, such integrated optical components become essential parts of fiber optic communication networks devoted to telecommunications or data communications applications. An excellent example of one such integrated component is the integrated optical switch which finds great utility in its ability to switch in a selected user at each local terminal of, for example, a local-area network.

As pointed out above, of major concern is the transmission of electromagnetic radiation (light) at the 1.3 μm to 1.55 μm wavelength area, the wavelengths at which the light propagation loss through an optical fiber is at a minimum. Switches are an essential component of such integrated optical circuits since it is required within the circuits to switch light energy from one guided-wave path to another.

Initially, mechanical switches which utilize deflecting mirrors positioned to intercept and redirect the light energy of a beam were utilized in optical circuits. These mechanical switches have been replaced by more suitable optical components since rapid switching speeds are an essential criteria in the building of optical communication circuit-networks.

Integrated optical components have therefore become the preferred switching devices. These switches followed two approaches:
 (1) the formation of heterostructures using exotic alloys of InP on InP, and
 (2) LiNb$_3$ components formed by titanium-ion in-diffusion or by proton exchange.

Examples of integrated optical components in In-GaAsP/InP can be found in a paper by Mikami et al, "Waveguided Optical Switch In InGaAs/InP Using Free-Carrier Plasma Dispersion," *Electronic Letters*, Vol. 20, No. 6, Mar. 15, 1984, pp. 228 and 229, while examples of optical components utilizing Ti:LiNbO$_3$ can be found in a paper by A. Neyer, "Electro-Optic X-Switch Using Single Mode TiLiNbO$_2$ Channel Waveguides," *Electronics Letters*, Vol. 19, No. 14, July 7, 1983, pp. 553 and 554.

There are many drawbacks associated with the formation of heterostructures using exotic alloys of InP on InP. For example, the alloy composition of InGaAsP must be chosen very carefully so that the lattice constant of the quaternary exactly matches the lattice constant of the host InP substrate; the growth apparatus and the growth techniques required to form the alloys are extremely complicated and may include such complex techniques as metal-organic chemical vapor deposition and molecular beam epitaxy; and it is necessary to grow sequentially alternating layers of different materials in order to form the multi-layer heterostructures that are essential in the above-mentioned devices.

The disadvantages with respect to the Ti:LiNbO$_3$ are also numerous. For example, it is difficult to control the diffusion depth and ionic concentration of the Ti ions; the waveguide profiles are semicircular, which is not at an optimum match to the circular fiber-core profile; and there are a number of stability problems associated with this material.

It is therefore clearly evident that there exists a need for improved optical switches, and in particular, it would be highly desireable to fabricate an integrated optical component which is not subject to the drawbacks associated with prior art optical components.

SUMMARY OF THE INVENTION

The present invention overcomes the problems encountered in the past as set forth in detail hereinabove by providing optical components, more specifically, integrated optical switches which utilize a single elemental material in the form of crystalline silicon (x-Si) and which in conjunction therewith utilize an electrically controlled current (or electric field) to control the index of refraction thereof.

The electrically controlled integrated optical switches of the present invention are preferably operable in the 1.3–1.55 μm wavelength region but may extend beyond. They are configured in a cross-channel waveguide structure wherein the intersection (or a wide crossing) therein is also fabricated of single-crystal silicon, for example, in a n on n+ doped epitaxial structure. A controlled alteration in the index of refraction of the intersection region of the switch is produced by the electrically controlled injection of free carriers into the intersection. These carriers are injected by a forward biased p-n junction.

In a first preferred embodiment, carrier refraction is utilized to modulate the phase of light passing through the intersection region and preferentially select mode interference effects that produce switching of light outputs. In another preferred embodiment, carrier refraction is utilized to produce a selectively reflective portion at the switch intersection in order to control switching.

The particular material, i.e. crystalline silicon, utilized for the integrated optical switches of the present invention is essential and novel in several respects. First, the switches are built entirely from one material (crystalline silicon) so there is no hetero-laying of one material on another material and there are no heterojunctions for injecting carriers. The present invention relies upon all silicon homojunctions.

Secondly, the silicon material does not exhibit the Pockels effect, but instead utilizes other electro-optical switching mechanisms therein. This type of switching is accomplished by the passing an electric current through the silicon in order to alter the index of refraction thereof. Since silicon technology is extremely advanced, although not heretofore used in optical components, problems associated with the complexity of working with the exotic materials of the past have been completely eliminated.

More specifically, the electrically controlled integrated optical switch of the present invention is made totally of crystalline silicon with the starting material being in the form of a single-crystal Si layer grown epitaxially on a heavily doped Si substrate. By photolithography and dry etching, the epi layer is formed into "rib or ridge" waveguides in an intersecting or X-pattern. By choosing the proper rib dimensions, each ridge guide will be a single-mode channel waveguide at the 1.3 or 1.55 μm wavelength.

Generally, the electrically controlled controller is in the form of a pair of Ohmic electrodes positioned on opposite sides of the switch body and a low-voltage source of approximately 5 volts capable of approximately 200 mA maximum output. Adjustment of the current passing through the silicon switch body enables optical switching to take place.

It is therefore an object of this invention to provide a guided-wave integrated optical switch made entirely of crystalline silicon.

It is a further object of this invention to provide an integrated optical switch in which the index of refraction thereof (switching capability) is changed by the application of electrical current or voltage thereto.

It is still another object of this invention to provide an electrically controlled integrated optical switch which is extremely simple to produce and which overcomes many of the manufacturing drawbacks of past integrated optical switches.

For a better understanding of the present invention, together with other and further objects, reference is made to the following description taken in conjunction with the accompanying drawings and its scope will be pointed out in the appended claims.

DETAILED DESCRIPTION OF THE PREFERRED EMBODIMENTS

Figure 3:
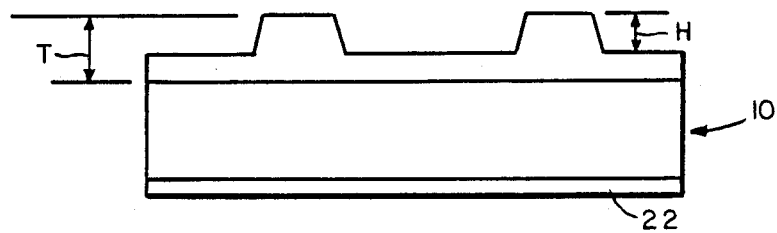
FIG. 3 is an end view of the electrically controlled integrated optical switch of FIG. 1.
Figure 4:
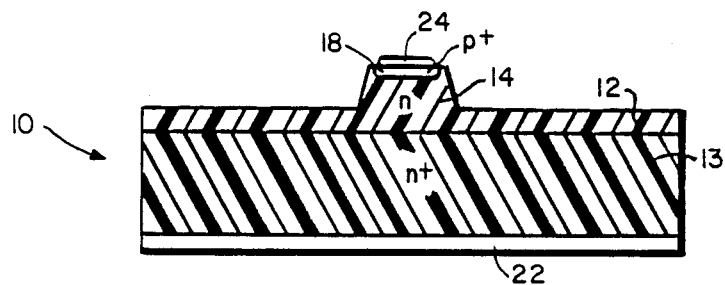
FIG. 4 is a cross-sectional view of the electrically controlled optical switch of FIG. 2 taken along line IV—IV of FIG. 2.

Reference is now made to FIGS. 1–8 of the drawings in which the electrically controlled integrated optical (electrooptic) switches of the present invention are depicted. It is essential in the present invention that the electrooptic switches be fabricated entirely of crystalline silicon, for example, in an n on n+ epitaxial structure (or in a p on p+ structure). More specifically, switches are fabricated by starting with material in the form of a lightly doped single-crystal silicon layer 12, 56 grown epitaxially on a heavily doped x-Si substrate 13, 42. By photolithography and dry etching, the epi-layers 12, 56 are formed into rib waveguides 14, 48 in an intersecting pattern. As illustrated in FIG. 4, the doping of the higher-index n-type waveguide region is in the range of $10^{14}$ to $10^{17}$ impurities/cm$^3$ and the lower-index n+ substrate 13 has a doping of approximately $10^{19}$ cm$^{-3}$. Examples of typical doping impurities would be phosporous or boron. The thickness, T, as shown in FIG. 3, of epitaxial layer 12 is typically 5 to 10 microns.

Figure 7:
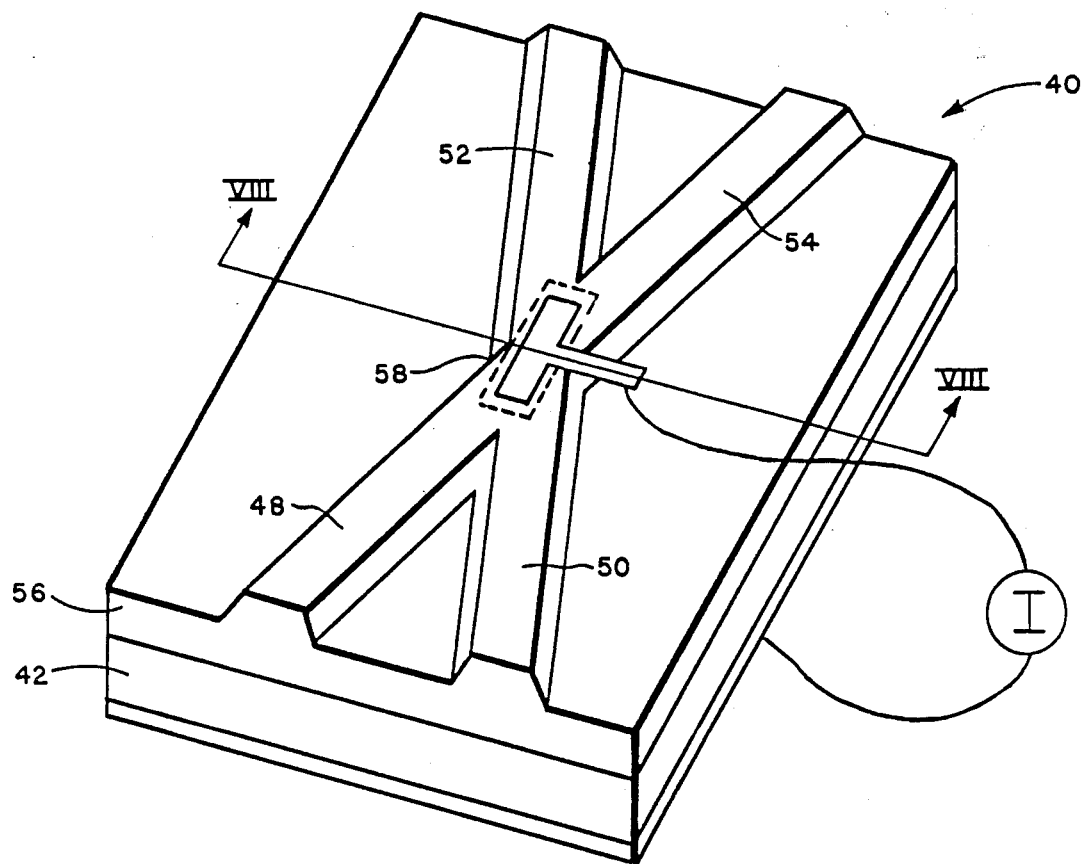
FIG. 7 is a schematic of another electrooptic switch of this invention, which utilizes selective reflection to control switching.
Figure 8:
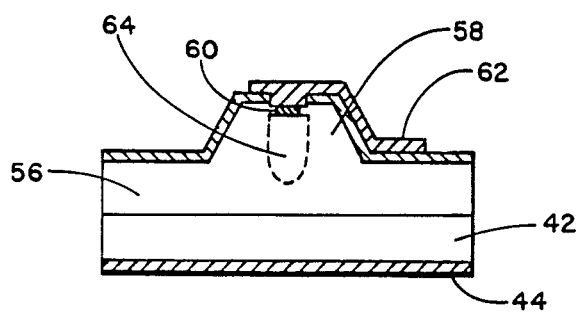
FIG. 8 is a cross section of the switch of FIG. 7 taken across line VIII—VIII of FIG. 7.

In some cases, as shown in FIGS. 1–5, the waveguides 14 are multimode with a rib width W (FIG. 2) of 10 to 15 microns, and a rib height H (FIG. 3) of 2 to 4 microns. In the multimode switch 10 of FIG. 1, the switching is less complete than it is when the waveguides are single mode, i.e., the multimode switch 10 has higher crosstalk and higher loss than the single mode switch 10' illustrated in FIG. 6, wherein similar components as set forth with respect to FIGS. 1–5 are designated by identical reference numerals. Therefore, a single-mode embodiment (FIG. 6) is preferred for optimum switching, based on carrier refraction and mode interference. Switch 40 of FIGS. 7 and 8 is more effective as a multi-mode switch since it operates on the principle of selective reflection.

Figure 6:
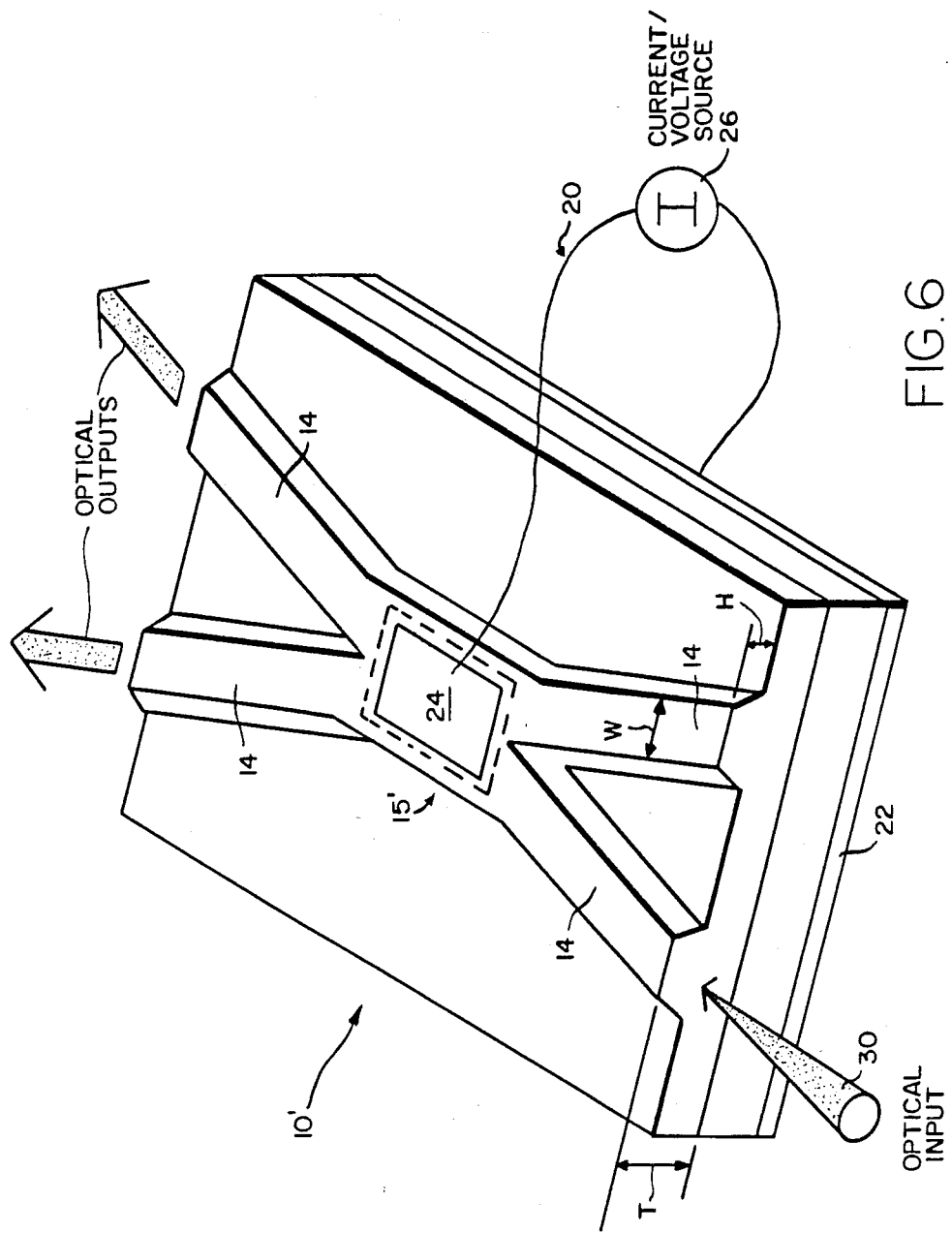
FIG. 6 is a pictorial representation of an alternate embodiment of the electrically controlled integrated optical switch having a larger, double-width waveguide interaction region.

The input and output waveguides 14 in FIG. 6 each support only a single optical mode at the 1.3 or 1.6 μm wavelength. Here each rib waveguide 14 has a width, W, of 5 to 7 microns, an epi thickness, T, of about 6 microns and a rib height, H, of about 3 microns. In addition, the width of the waveguide intersection 15' is twice the width of the single-mode input/output guides 14 so that this region will support two guided modes; an even (symmetric) and an odd (antisymmetric) mode. (Two-mode interference is useful for "clean" switching). The length of the intersection region is also slightly longer than that in FIG. 1. Because of its efficient, low-crosstalk switching, the extended-X with double-width coupling region (FIG. 6) is the most useful structure.

Referring again to FIGS. 1–6 of the drawings, if, for example, an n on n+ wafer is utilized, then fabrication of a p+ region 18 on top of the intersection region 15 as illustrated clearly in FIGS. 4 and 5 would form a p+-n junction at that location. This junction 18 could be formed by ion implantation or by thermal indiffusion of ions. The depth of the junction 18 below the surface of the intersection waveguide crossover region 15 would be approximately 0.4 microns, so it would only take up a small portion of the waveguide height.

Figure 5:
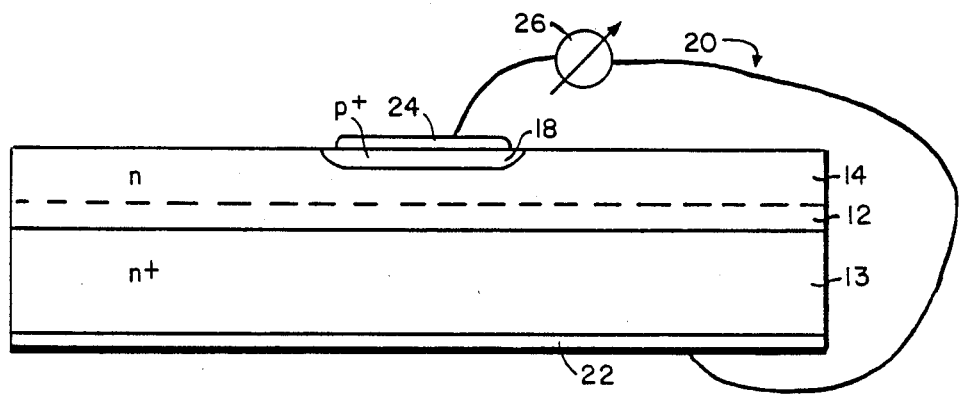
FIG. 5 is a side view of the electrically controlled integrated optical switch of FIG. 1.

As pointed out above, it is essential that 2×2 switch 10, 10' or 40' of the present invention be made entirely out of crystalline silicon (x-Si). The optical absorption losses in polycrystalline silicon and amorphous silicon are too high for most practical devices, where, crystalline silicon has very low loss. Although x-Si does not exhibit the Pockels effect, there are two important electro-optical mechanisms in x-Si that are practical for optical switching. These are as follows: electrically controlled injection or depletion of carriers, (carrier refraction) and electro-refraction. Each of these effects perturbs the refractive index of x-Si without introducing appreciable optical loss. Carrier injection, for example, is accomplished by passing electric current through the silicon. Generally, the electrically controlled controller 20 utilized in the present invention and as illustrated in FIG. 5 of the drawings is in the form of a variable voltage source 26, plus a pair of Ohmic contacts 22 and 24 positioned on opposite sides of the body of switch 10. In the injection case, a 5-volt source 26 capable of approximately 200 mA maximum output is preferable, and is connected between electrodes 22 and 24. The electrode locations provide uniform current density in the p+-n-n+ waveguide crossover region 15.

If p+-n junction 18 is forward biased, then minority carriers will be injected into the n-type waveguide intersection region 15 (15'), and the effective mode indices of the waveguide 14 will be altered due to the plasma dispersion effect and due to the decreased energy gap of this semiconductor that occur at high injection. When current densities of 5 to 10 kA/cm$^2$ are applied, more than $10^{18}$ carriers/cm$^3$ will be injected, and the resulting index change will be $10^{-3}$ or more. Adjustment of the current passing through the silicon body by altering the source-output enables optical switching to take place between the crossed waveguides 14.

The 2×2 switching device of FIG. 6 operates on the principle of two-mode interference. The region 15', where the two waveguides merge, can support two modes, an antisymmetric (odd) and a symmetric (even) mode. The input and output waveguides are single-moded. The p-n junction control region covers the entire width of the 2-mode region, and thereby affects the symmetric mode preferentially; the antisymmetric mode is not strongly perturbed. When actuated sufficiently, the carrier refraction produces a 180° relative phase shift between the 2 modes over a distance L. This causes the mode interference pattern to shift from maximum at a first output-guide to a maximum of a second output-guide, i.e., total switching occurs.

In actual operation, and referring to the electrical integrated optical switch 10' depicted in FIG. 6, for example, a beam 30 of electromagnetic radiation (light) at a wavelength of 1.3 μm is launched into the fundamental mode (an even mode) of waveguide 14 by a single-mode fiber or laser (not shown). When the optical "beam" arrives at the double-width intersection or junction 15', both an even and an odd mode are excited, and these optical waveguide modes travel with propagation constants $\beta_{00}$ and $\beta_{01}$, respectively. After traversing a length L, the modes have a relative phase $\Delta\phi=[\beta_{00}-\beta_{01}]L$, and they combine (in the zero-current case) to excite the fundamental mode of the straight-through guide, which gives a "straight ahead" optical output. The width of the p$^{30}$-n junction is nearly the same as that of the intersection region 15', i.e., 2 W. Thus, when current is applied by a variable electrical source and carriers are injected, the mode index of the even symmetric mode $\beta_{00}$ is altered, but the index of the odd antisymmetric mode $\beta_{01}$ is relatively uneffected. (It would take an unsymmetric half-width p-n junction to affect $\beta_{01}$). As a result, the phase difference $\Delta\phi$ is altered and the two optical outputs of the switch will have optical power levels described by:

$$P_3/P_1=\sin^2(\Delta\phi/2) \text{ and } P_4/P_1=\cos^2(\Delta\phi/2).$$

At sufficient current, $\Delta\phi=\Delta\phi+\pi$, the modes now combine (interfere) to give total output in the cross-guide (complete switching occurs due to control of the mode interference pattern). With two independent optical inputs, superposition shows that switch 10' as depicted in FIG. 6 becomes a 2×2 electro-optical switch. At the $\Delta n$ values cited above, complete exchange of optical energy between the guides 14 is feasible.

Figure 1:
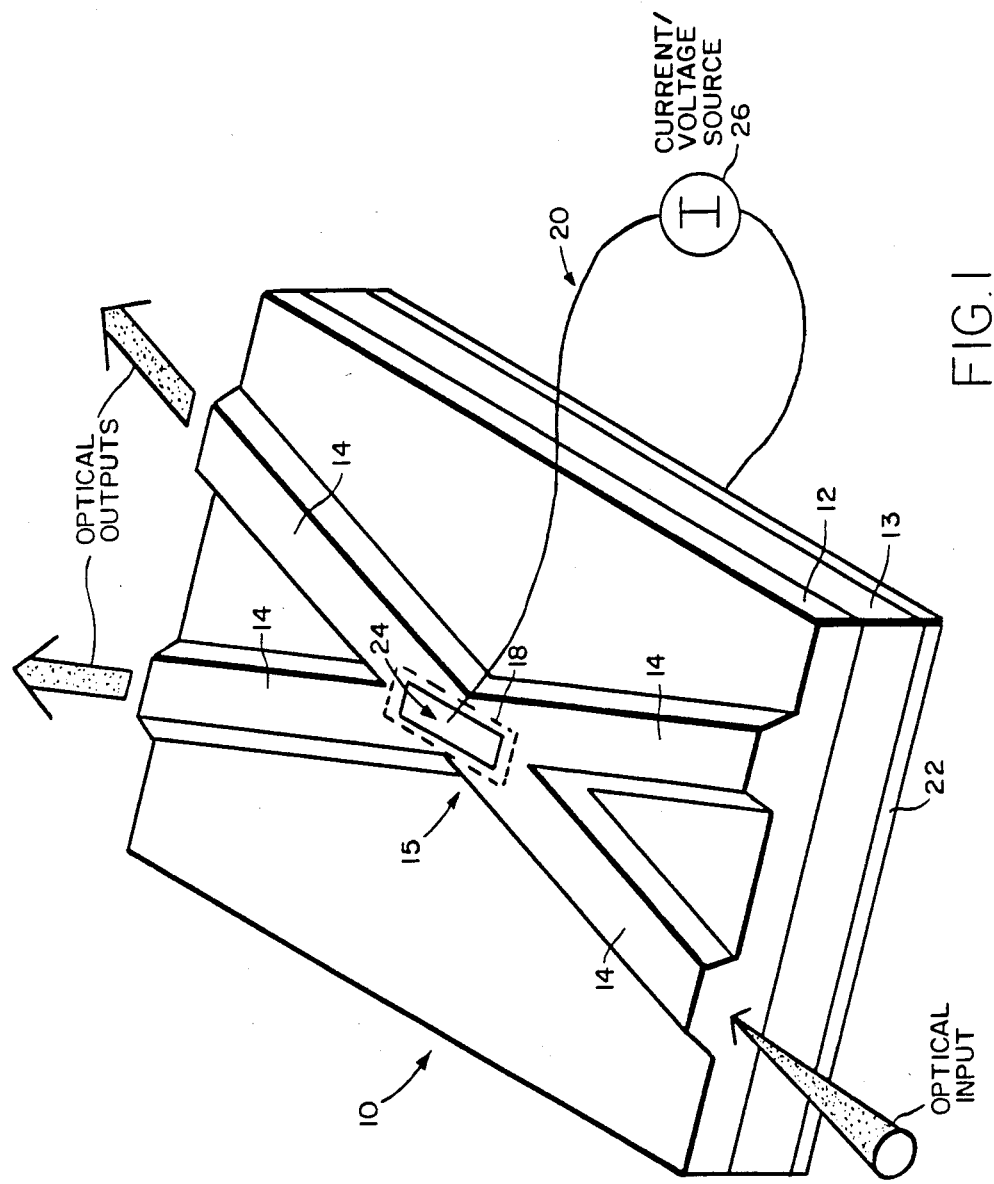
FIG. 1 is a pictorial representation of an electrically controlled integrated optical switch of this invention.
Figure 2:
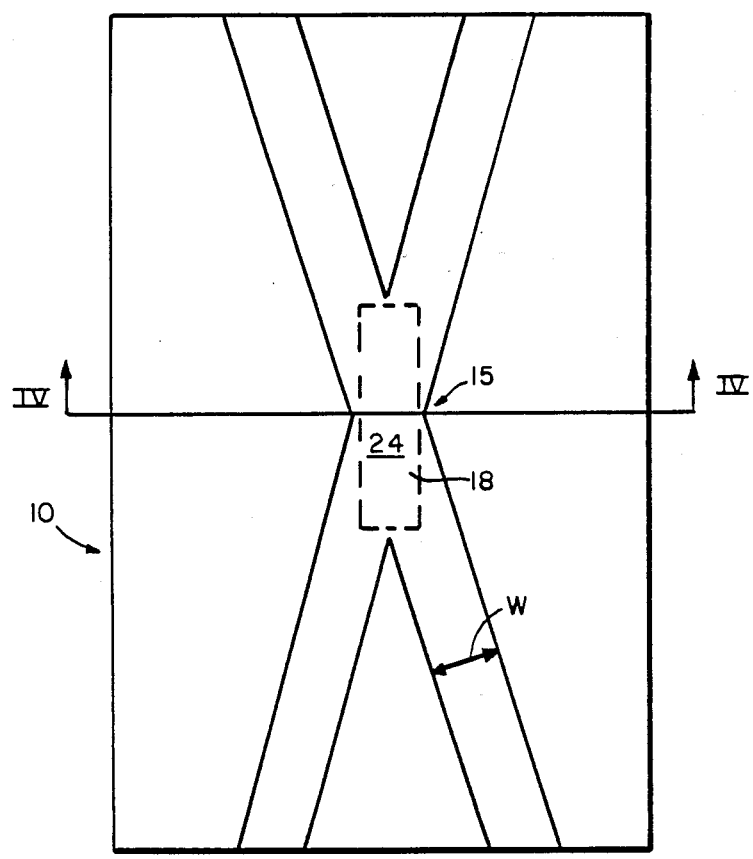
FIG. 2 is a plan view of the electrically controlled integrated optical switch of FIG. 1.

It should be noted that the p+-n-n$^{30}$ structure in FIGS. 1 or 6 could just as easily be an n$^{30}$-p-p+ structure. For clarity, an SiO$_2$ passivation layer covering the p-n junction edges was not shown in the Figures, but may be desirable. The oxide would also be located under the lead-in electrodes. Various features can be added to the structures shown to improve performance; for example, a thin p$^-$ silicon cladding layer could be formed atop the n-type epi as a cladding (a p$^+$-p$^-$-n-n$^+$ structure) to reduce optical "tailing" loss in the p+ region.

FIGS. 7 and 8 show an electrooptic switch 40 which accomplishes switching by selective reflection of optical signals. The switch 40 comprises a silicon substrate 42 having an Ohmic contact 44 (FIG. 8). The waveguides 48, 50, 52 and 54 are formed in a top silicon layer 56 which is formed upon substrate 42. The substrate is preferably highly doped n$^{30}$-type silicon and the waveguides are formed in lightly doped n-type silicon.

The waveguides join at a common intersection (common area) 58. The waveguide pairs 48, 50, 52, and 54 diverge from the intersection 58 at about a 6° to 9° angle. Formed in the center of the intersection is a stripe of p+-type material 60. The stripe has an exaggerated width in the view of FIG. 8 and preferably is only about 10 percent of the width of the intersection. The p-type stripe is connected to surface Ohmic contact 62.

The p+ stripe is electrically connected such that under forward bias holes or electrons are injected into the central region of the intersection 58. These injected carriers produce an electrooptic perturbation $\Delta n$ which caused the formation of a thin vertical reflective vane 64, having a lowered index of refraction. The vane forms from top to bottom of the intersection 58 and acts as a variable mirror to incoming optical signals. In the "on" state optical signals are totally internally reflected and diverted to a cross channel (for example, from guide 48 to guide 52). In the "off" state optical signals pass straight through the intersection 58 (for example, from guide 48 to guide 54) with virtually no reflectance from vane 64. For a 6°-9° intersection angle, the required electrooptic perturbation ($\Delta n$) for total internal reflection ranges from $\Delta n=0.005$ to $\Delta n=0.011$.

A wide variety of electrooptic structures operating in the preferred 1.3-1.6 micron region are shown or implied by the above discussion. All such devices are constructed from silicon and can be readily integrated with conventional silicon electronic structures, silicon waveguides and silicon fiber optics. These devices, therefore, can bridge the gap between optic structures and conventional electronics.

While the invention has been particularly described with reference to the preferred embodiments thereof, it will be understood by those skilled in the art that various changes in substance and form can be made therein without having departed from the spirit and the scope of the invention as detailed in the attached claims.

We claim:
1. An electrooptic switch comprising:
(a) a silicon substrate;

(b) a crystalline silicon layer deposited upon said silicon substrate, said crystalline silicon layer formed into two intersecting waveguides having a common area which comprises a p-n junction capable of forming a variable mirror for selectively diverting optical signals;

(c) a passivating layer substantially covering said crystalline silicon layer;

(d) a first contact electrically connected to said waveguide common area; and (e) a second contact electrically connected to said waveguide common area, said first and second electric contacts for providing an electric current through said switch in order to activate said p-n junction and selectively divert light travelling through said waveguide common area.

2. The electrooptic switch of claim 1 wherein said common area comprises a n-type region and a p-type region, said p-type region forming a variable mirror for selectively diverting optical signals.

3. The electrooptic switch of claim 2 wherein said first contact is electrically connected to said n-type region and said second contact is electrically connected to said p-type region.

4. The electrooptic switch of claim 2 wherein said p-type region comprises p+ doped material.

5. The electrooptic switch of claim 2 wherein said p-type region comprises a narrow strip having a width of about 10 percent of the common area.

6. The electrooptic switch of claim 1 wherein the two intersecting waveguides cross at an angle of at least 6°.

7. An electrooptic switch comprising:

(a) a silicon substrate;

(b) a crystalline silicon layer deposited upon said silicon substrate, said crystalline silicon layer formed into two intersecting waveguides having a common area which comprises an n-type region and a p-type region, said p-type region forming a variable mirror for selectively diverting optical signals;

(c) a first contact electrically connected to said waveguide common area; and (d) a second contact electrically connected to said p-type region, said first and second electric contacts for providing an electric current through said switch in order to selectively divert light travelling through said waveguide common area.

8. The electrooptic switch of claim 7 wherein said p-type region comprises p+ doped material.

9. The electrooptic switch of claim 7 wherein said p-type region comprises a narrow strip having a width less than 10 percent of the common area.

10. The electrooptic switch of claim 7 wherein the two intersecting waveguides cross each other at an angle of at least 6°.

* * * * *